(12) United States Patent
Parker

(10) Patent No.: US 7,143,779 B2
(45) Date of Patent: Dec. 5, 2006

(54) PEDESTAL HYDRANT

(76) Inventor: Philip A. Parker, 628 Sheffield Dr., Richardson, TX (US) 75081

(*) Notice: Subject to any disclaimer, the term of this patent is extended or adjusted under 35 U.S.C. 154(b) by 189 days.

(21) Appl. No.: 10/146,211

(22) Filed: May 15, 2002

(65) Prior Publication Data

US 2005/0034763 A1 Feb. 17, 2005

Related U.S. Application Data

(60) Provisional application No. 60/294,174, filed on May 29, 2001.

(51) Int. Cl.
*F16K 49/00* (2006.01)
(52) U.S. Cl. .................. 137/375; 137/357; 137/382
(58) Field of Classification Search .............. 137/357, 137/375, 382
See application file for complete search history.

(56) References Cited

U.S. PATENT DOCUMENTS

| 105,830 | A | * | 7/1870 | Moore | 137/297 |
| 866,927 | A | * | 9/1907 | Moore | 152/288 |
| 2,937,009 | A | * | 5/1960 | Anderson | 138/34 |
| 4,971,097 | A | | 11/1990 | Hunley, Jr. et al. | 137/218 |
| 5,129,416 | A | | 7/1992 | Ackroyd | 137/218 |
| 5,947,150 | A | | 9/1999 | Ryan | 137/360 |
| 6,216,722 | B1 | | 4/2001 | Solomon | 137/297 |

* cited by examiner

*Primary Examiner*—A. Michael Chambers
(74) *Attorney, Agent, or Firm*—Salter & Matsil, L.L.P.

(57) ABSTRACT

A fluid delivering hydrant providing a valve actuated assembly with enclosing shroud and water resistive doom handle assembly to protect the assembly from exposure to the weather while preventing entry of rainwater into a building structure upon the roof of which the device has been installed.

10 Claims, 12 Drawing Sheets

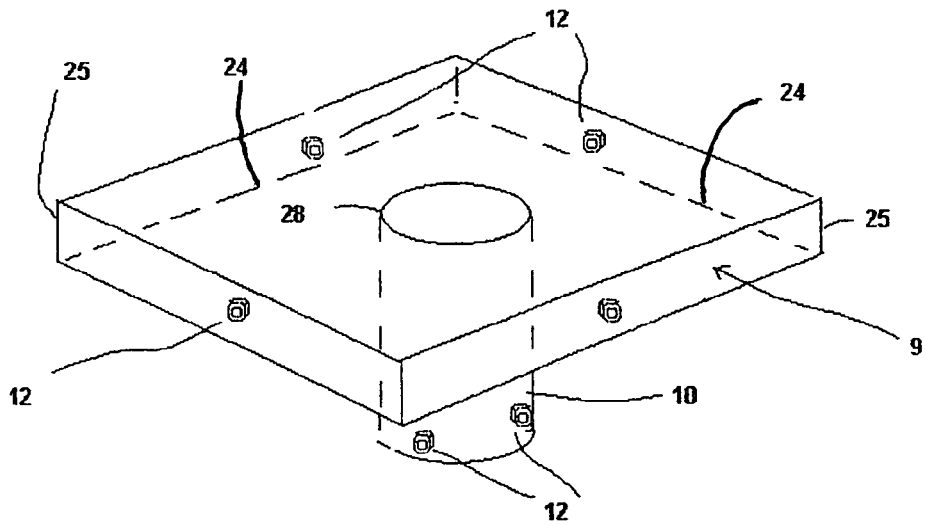
FIG. 5
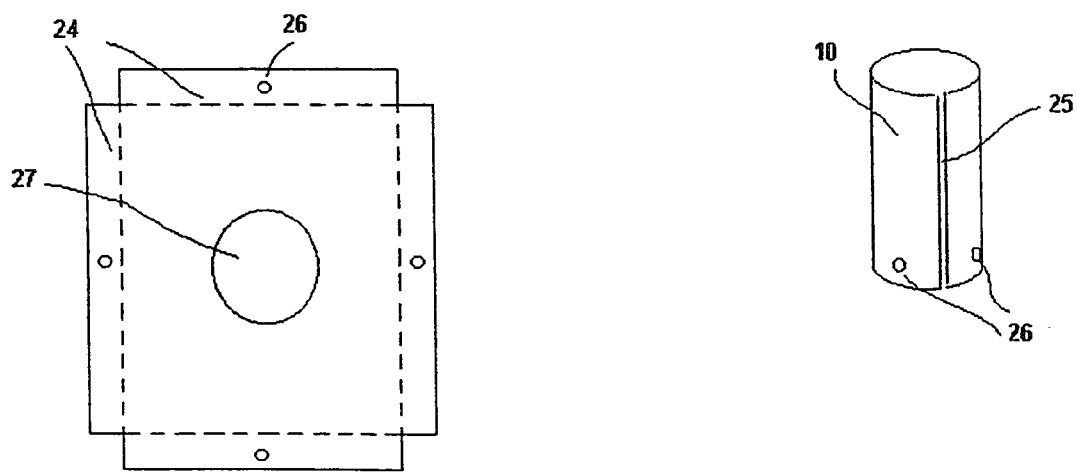
FIG. 5a
FIG. 5b
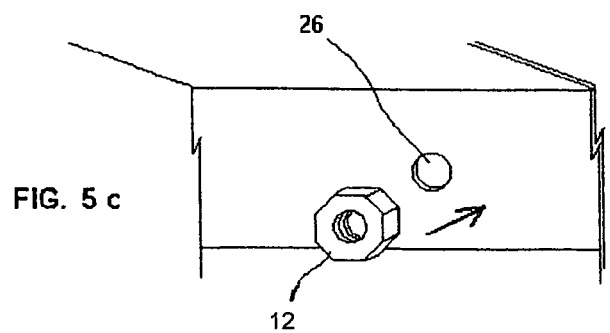
FIG. 5c

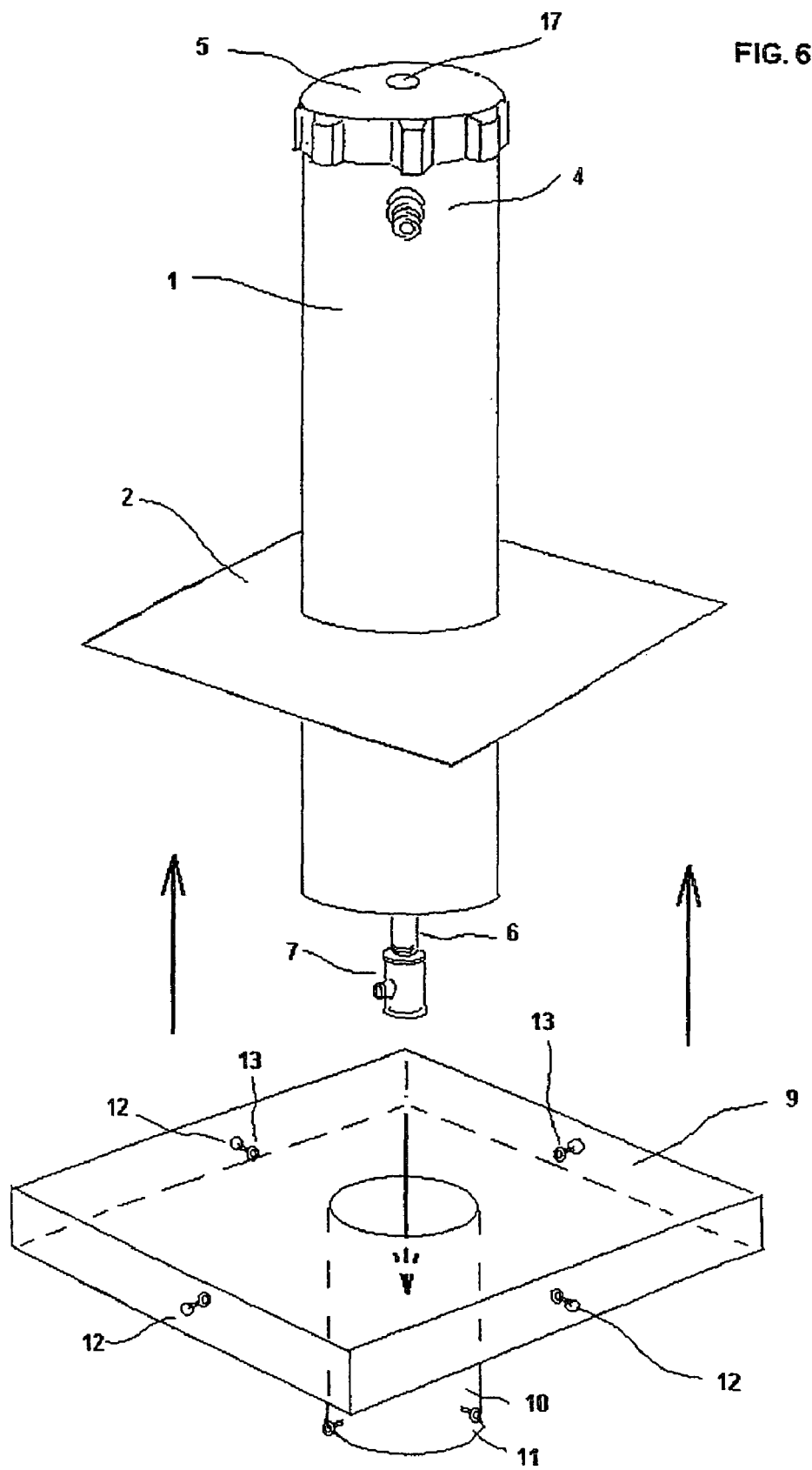

FIG. 9
FIG. 9 a
FIG. 9 c
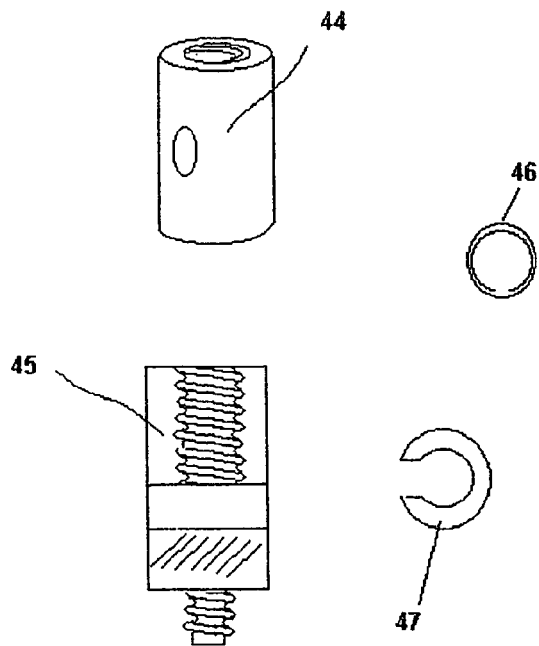
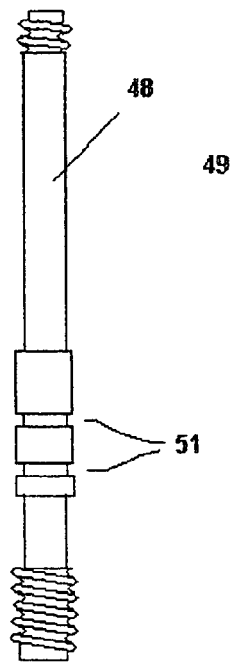
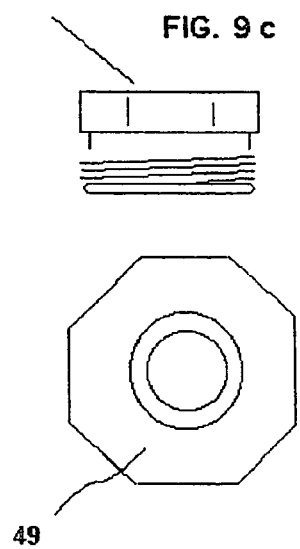
FIG. 9 b
FIG. 9 d
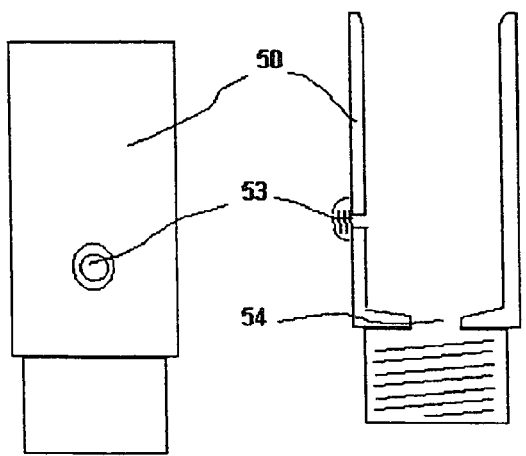
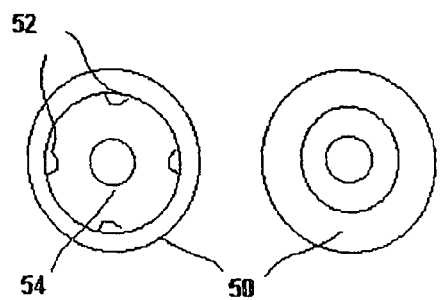

PEDESTAL HYDRANT

BACKGROUND—CROSS-REFERENCE TO RELATED APPLICATIONS

This application is entitled to the benefit of Provisional Patent Application Ser. No. 60/294,174, filed May 29, 2001.

FIELD OF INVENTION

This Invention is in the field of actuating fluid delivery devices.

BACKGROUND OF THE INVENTION

In the field of construction and especially instances relating to the plumbing trade, it is common to install a means to provide a source of potable water on a flat roof. The purpose of this source, often a water hydrant so to permit maintenance personal to utilize the water extracted from the hydrant to hose down or wash equipment mounted upon the roof's surface. Such equipment would include roof top air conditioners and exhaust fans that periodically require cleaning in order to assure efficient operation, void of dust and other wind blown debris.

Typically, the installer of a water hydrant would devise a means to prevent rainwater from entering the building through a roof penetration used to source the hydrant. FIG. 12, FIG. 13, and FIG. 14 are prior art illustrations of such devices. FIG. 12 shows a freeze resistant hydrant housed within a sheet metal hooded enclosure. The hooded enclosure receives loose insulation around the insulated piping to prevent freezing. The hood is intended to prevent rainwater from penetrating the enclosure. The entire apparatus is flashed to the roof to prevent leakage at its perimeter.

Figure 12:
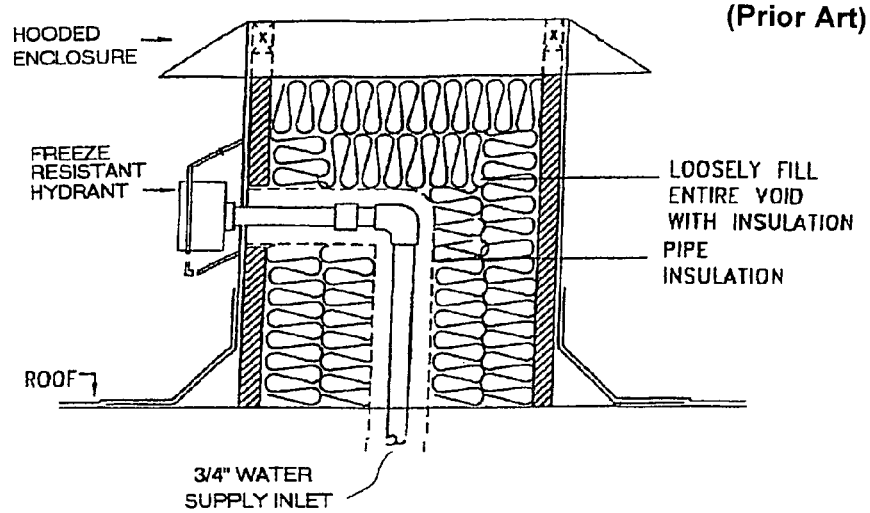

All described means are common in the construction industry with various modifications as to height of placement of the hydrant above the roof or design of the enclosure or means to prevent rain water from entering the building. Unfortunately, all depend too strongly on the lack of human error in their installation to assure satisfactory performance. To illustrate, as shown in FIG. 12, since the enclosure is formed and filled typically by a trade, the skills and craftsmanship or lack of skills of the installing trade weighs heavily upon the successful installation. If the enclosure is poorly made, fitted or sealed, then there is a risk of leakage. If the loose installation is not properly installed, then there is the risk of pipe freezing during colder weather.

Figure 13:
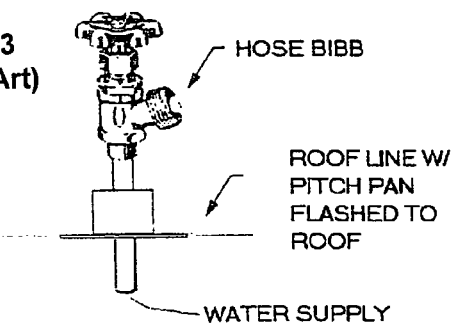
FIG. 13 is a simple hose bibb type of hydrant that penetrates through a flashing or pitch-pan that is sealed to attempt rainwater from entering the building through the penetration.
Figure 14:
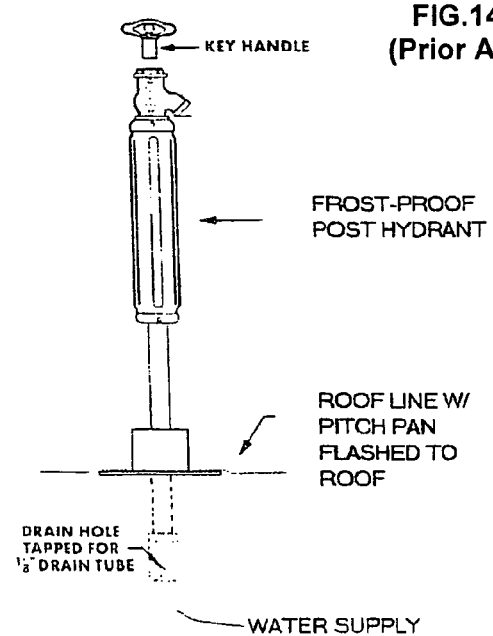
FIG. 14 shows the use of a common frost-proof post hydrant mounted atop a roofline with the penetration at the roof scaled at a pitch-pan.

In FIG. 14, the watertight seal at the pitch pan is subject to disruption by the mere fact that the post hydrant extends well above the roofline. During usage, it will become easy to pull and then push the post about creating potential sources of leakage. Similarly, the hydrant in FIG. 13 may succumb to like disruptions of the seal at the pitch pan. Also, since this from of hydrant has no frost resistive features, it is more prone to freeze during colder weather.

The invention is an assembled fluid delivery device that permits the utilization of water for the purpose of cleaning roof mounted equipment and that additionally prevents potential leakage of rainwater into the building while providing for freeze protection for the assembly. The device has a conventional valve assembly and utilizes conventional piping and fitting. The pedestal however is enclosed within a solid shroud. The shroud is made of stainless steel tubing to prevent deterioration of the pedestal from weathering. A layer of an insulation material surrounds the piping and valve assembly to prevent freezing.

A dome handle sets atop the pedestal. This dome serves two purposes. First, it permits ease in the opening and the closing of the hydrant. Second, it serves as a watershed thus preventing rainwater and the such from entering the shroud.

The invented pedestal hydrant when placed on a flat roof surface will provide adequate means for a user to obtain the fresh water often needed in the maintenance operations associated with the cleaning of roof mounted equipment such as air conditioning units. The shroud prevents rusting and other affects of the weather. The insulation prevents freezing. The dome prevents rainwater from entering the shroud and thus the building structure below.

A stainless steel base, having a continuous welded seam at the connection point to the shroud, enables roofing materials to seal watertight the pedestal to the roof surface. A reinforcing flange which is inserted onto the lower portion of the pedestal hydrant secures the pedestal to the roof structure. Conventional piping fittings are used to allow the installer to provide water supply and drain piping to the pedestal hydrant.

OBJECTS AND ADVANTAGES

Accordingly, several objects and advantages of my invention are:
 A. The assembly is convenient for the installer to mount atop a roof surface.
 B. The connection fittings located at its base provide for ease in connections of water supply and drain.
 C. The stainless steel shroud provides for a freeze resistant housing with pipe insulation placed about the piping within.
 D. The flange permits ease in the "flashing-in" of the hydrant assembly to the roof membrane.
 E. The lower flange enables the device to be securely affixed to the structural members of the roof.
 F. The doomed handle provides for actuation of the hydrant while preventing rainwater from penetrating the enclosure.

DRAWINGS

Figure 1:
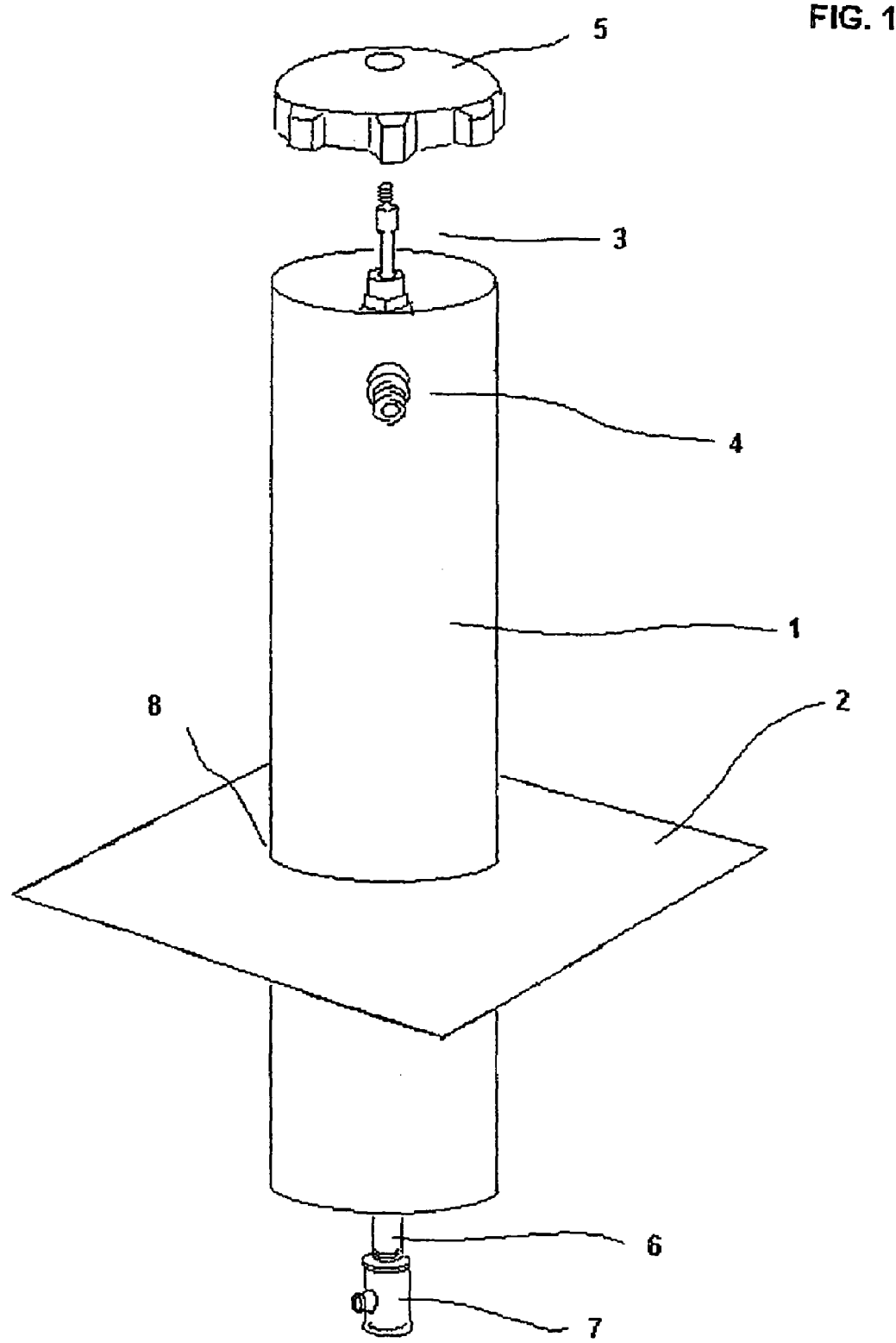
Figure 2:
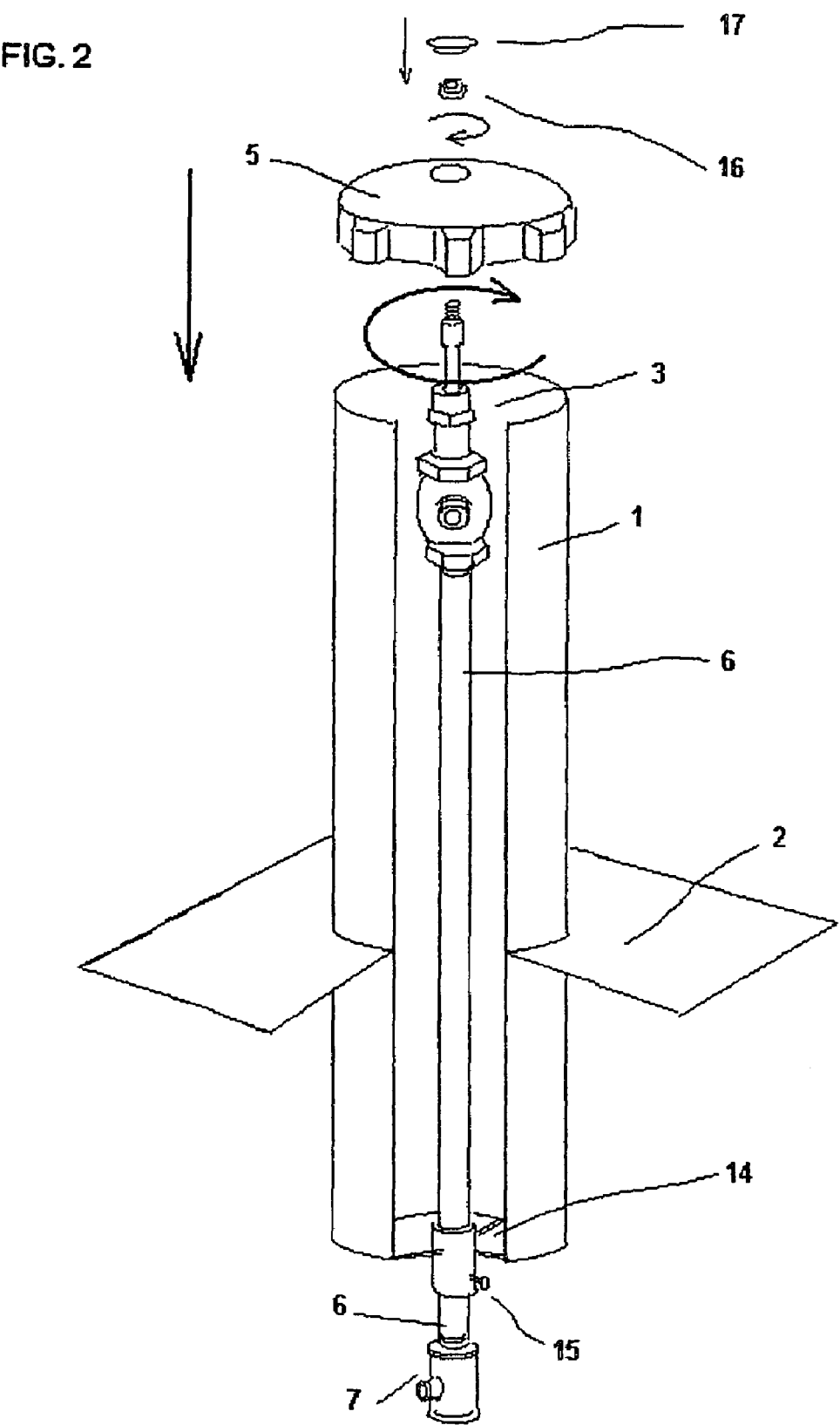
Figure 3:
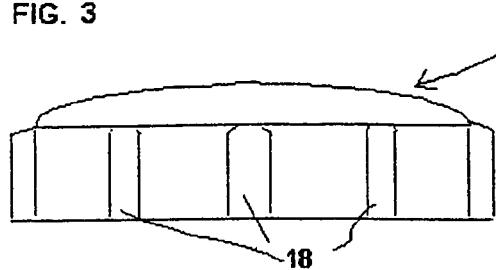
Figure 3:
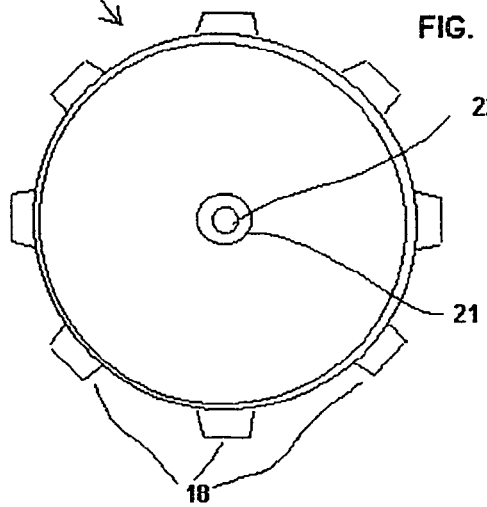
Figure 3:
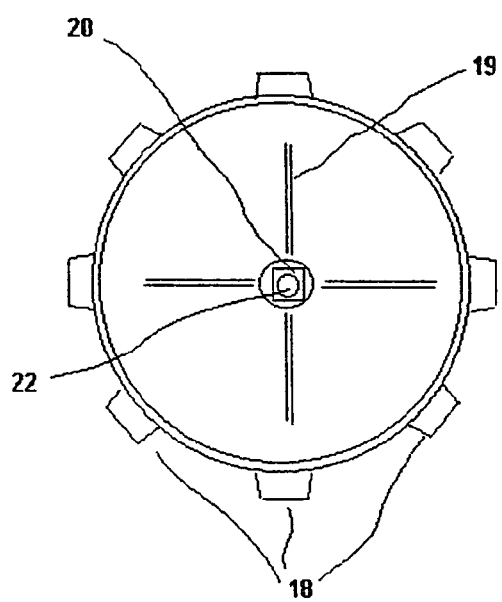
Figure 3:
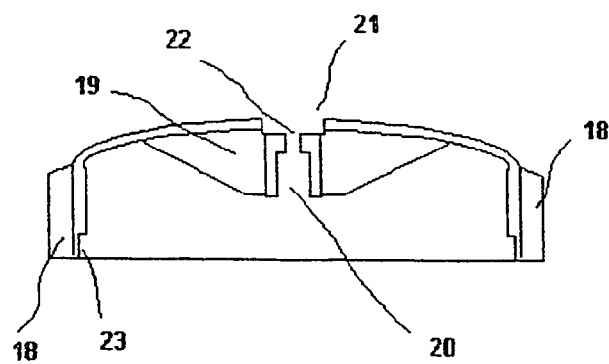
Figure 4:
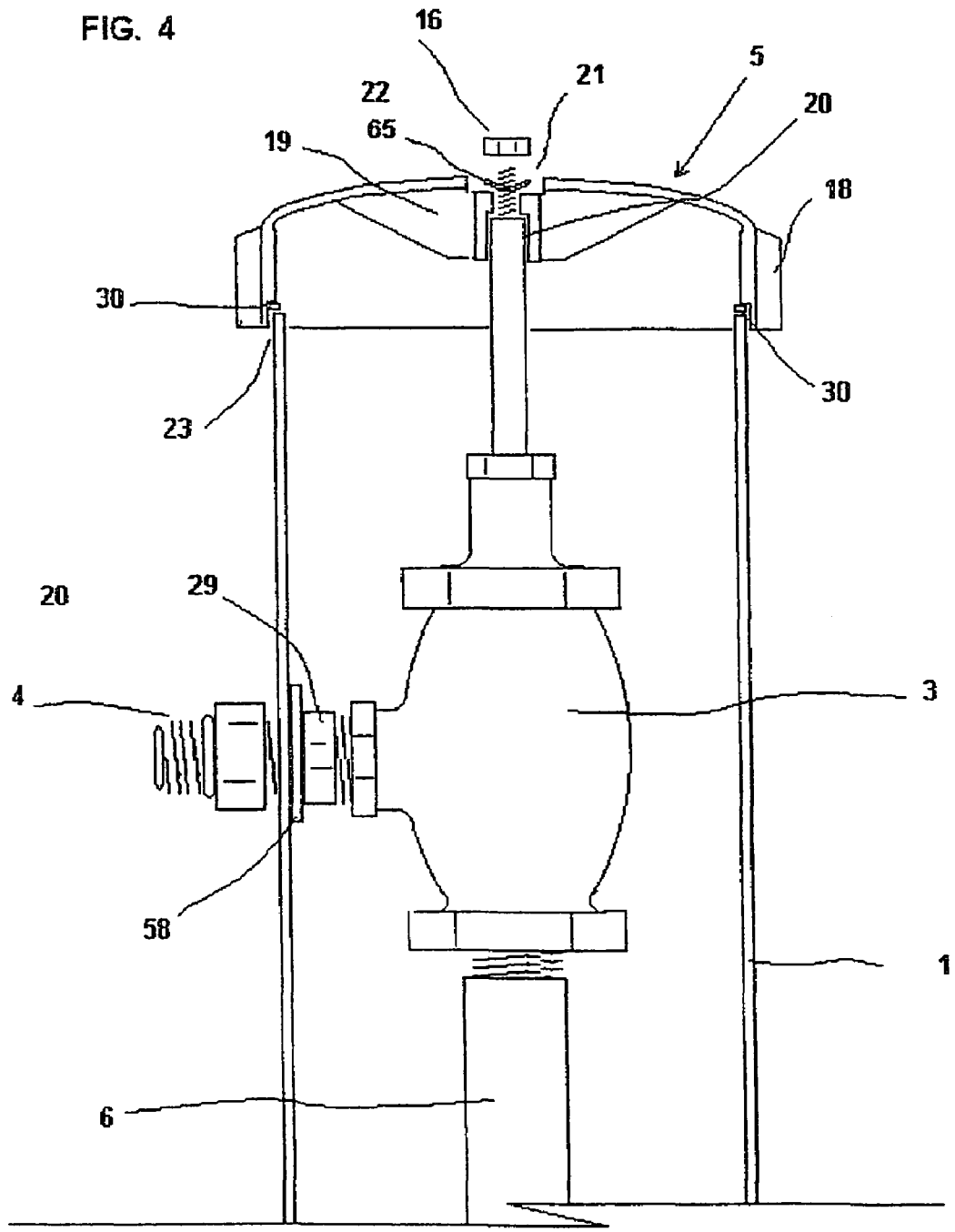
Figure 7:
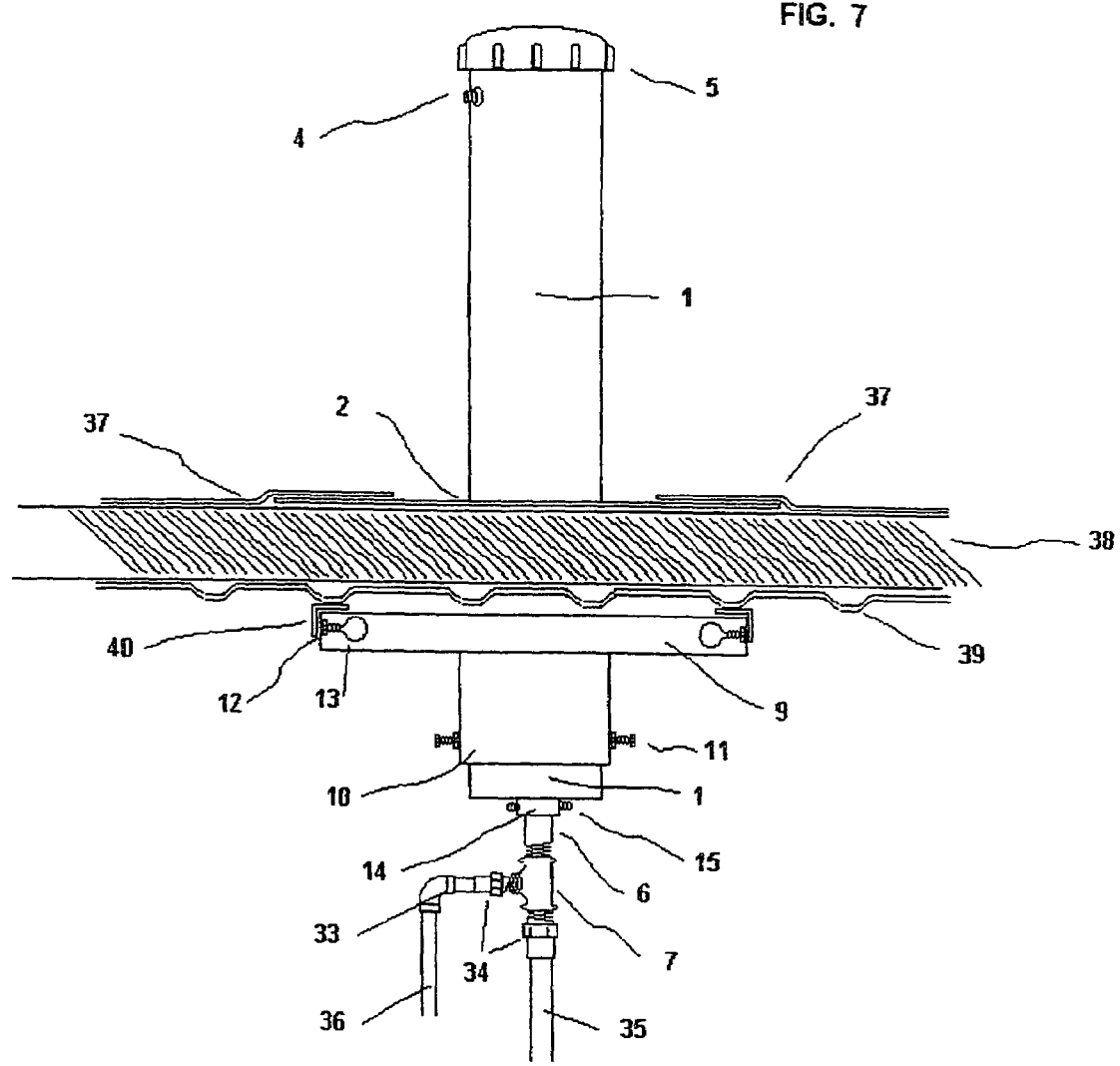
Figure 8:
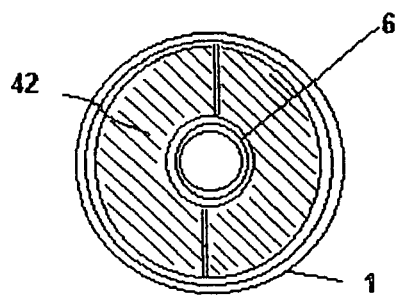
Figure 8:
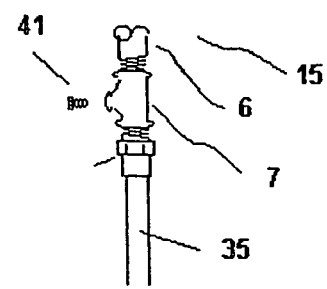
Figure 8:
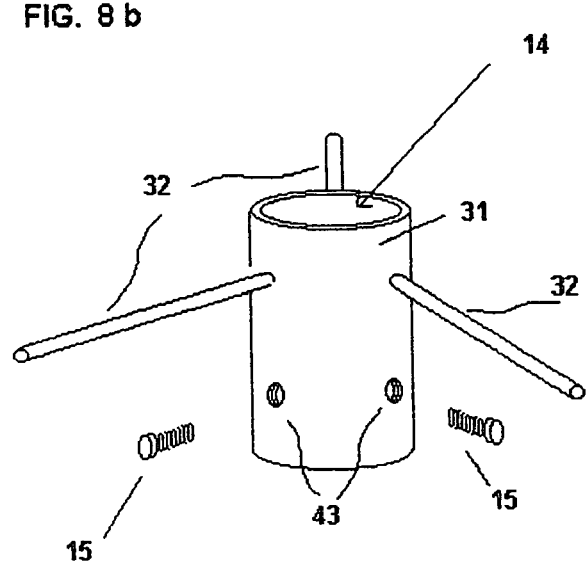
Figure 8:
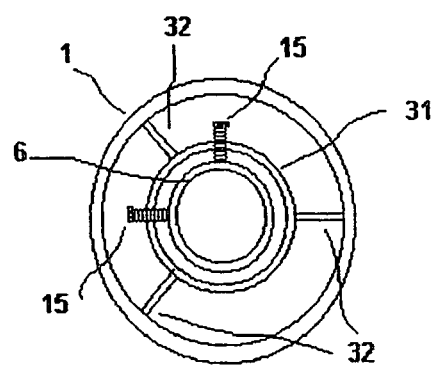
Figure 10:
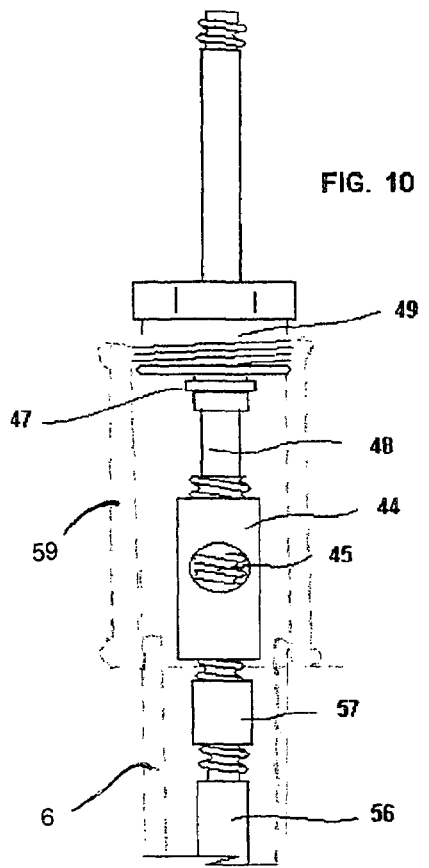
Figure 10:
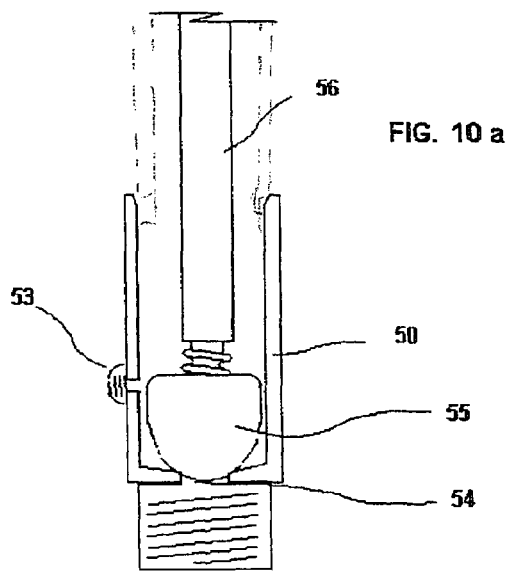
Figure 10:
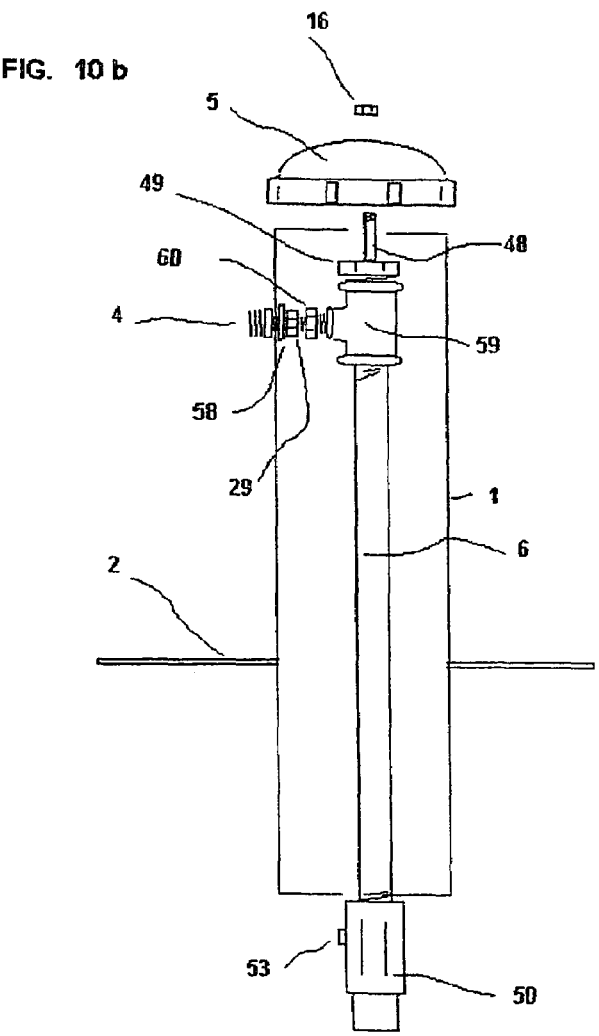
Figure 11:
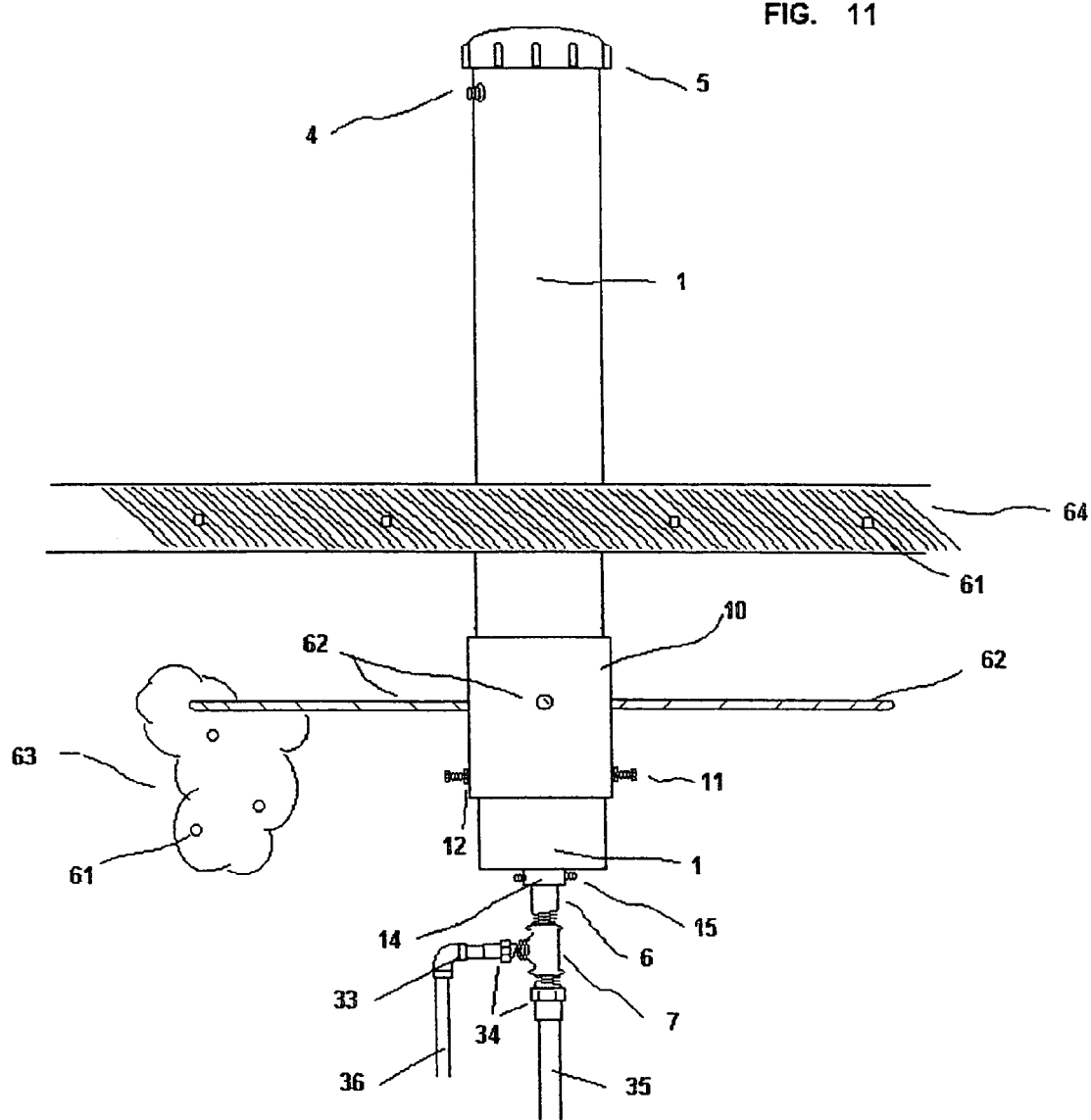

FIG. 1 is an overall view of the pedestal hydrant with primary components;

FIG. 2 is a cutaway view of the pedestal hydrant;

FIG. 3–FIG. 3c are detail drawings of the dome handle;

FIG. 4 is a sectional view of the pedestal hydrant;

FIG. 5–FIG. 5c are detail drawings of the under-deck flange;

FIG. 6 demonstrates how the under-deck flange slips over the stainless shroud;

FIG. 7 is a side view of the pedestal hydrant upon complete installation on a roof;

FIG. 8–FIG. 8c are detail drawings of various components of the pedestal hydrant;

FIG. 9–FIG. 9d are drawings showing an alternate freeze-proof valve assembly;

FIG. 10–FIG. 10b are drawings showing this alternate assembly incorporated into the invention;

FIG. 11 shows another embodiment utilized for an additional use; and

FIGS. 12, 13, 14 illustrate prior art examples of installing a water hydrant on a roof.

NUMERALS

1 Stainless Steel Shroud
2 Stainless Steel Base
3 Threaded Angle Globe Valve
4 Hose Fitting Vacuum Breaker
5 Dome Handle
6 Threaded Nipple
7 Threaded Tee
8 Continuous Welded Seam
9 Under-Deck Flange
10 Under-Deck Cylinder
11 Hex-head Set Screw
12 Threaded Hex Nut
13 Wing-nut Set Screw
14 Stirrup
15 Socket Set Screw
16 Stem Securing Nut
17 Snap-in Cover
18 Finger Grips
19 Reinforcing Ridges
20 Stem Insertion Cavity
21 Stem Securing Nut Cup
22 Round Hole
23 Weathering-Guard Recess
24 Bend Line
25 Weld Seam Point
26 Round Hole
27 Cylinder Hole
28 Tack-weld Seam
29 MIP x Hose Adapter
30 Weathering-Guard Gasket
31 Stirrup Collar
32 Stirrup Braces
33 Pipe Elbow Fitting
34 Pipe Fitting Adapters
35 Water Supply Piping
36 Drain Piping
37 Roofing Material
38 Roofing Insulation
39 Roof Decking
40 Steel Angle Framing
41 Pipe Plug Fitting
42 Pipe Insulation
43 Tapped Holes
44 Piston Cylinder
45 Piston Threads
46 O-Ring
47 Retaining Washer
48 Valve Stem
49 Retaining bushing
50 Valve Body
51 Insert Groove
52 Retaining Flanges
53 Drain Port
54 Valve Seat
55 Valve Plunger
56 Valve Guide Rod
57 Rod Coupling
58 Gasket
59 Threaded Tee
60 Threaded Bushing
61 Steel reinforcing bar
62 Steel anchoring bar
63 Anchoring concrete
64 Concrete walkway
65 Wave Washer

DETAILED DESCRIPTION OF THE DRAWINGS

FIG. 1 is an isometric view of the pedestal hydrant detailing the exposed components. Stainless steel shroud 1 encases threaded angle globe valve 3. This valve is of common construction, having both female threaded inlet and outlet. Hose fitting vacuum breaker 4 extends through the shroud from the valve through a round hole in the shroud. Dome handle 5 appears loose on the drawing.

A Stainless steel base 2 is secured to shroud 1 by applying continuous welded seam 8 around the perimeter of the shroud. At the lower extreme of the pedestal hydrant is viewed threaded nipple 6 and threaded tee 7. These components and their use are explained in future drawings.

FIG. 2 is a sectional view of that shown in FIG. 1. Valve 3 is shown full view. Threaded nipple 6 is an extended length of galvanized plated steel pipe that extends from the nipple threads of the female inlet threads of valve 3 and downward beyond the full length of shroud 1. Nipple 6 is secured in place at stirrup 14 by means of the tightening of socket set screws 15 against the surface of the nipple. Nipple 6 terminates at threaded tee 7.

The circular arrow above dome handle 5 in FIG. 2 illustrates the turning motion of dome handle 5 when attached to valve 3. As is the case with most standard and conventional valves, turning the stem clock-wise will close the valve while turning the handle in reverse or counter clockwise will open the valve.

FIG. 3 is a side view of dome handle 5. The view demonstrates the several finger grips 18 that are located around the surface of the handle. The handle is constructed of cast aluminum or any of many types of durable products.

FIG. 3a is a top view of the handle. Again, finger grips 18 are illustrated. Stem securing nut cup 21 and round hole 22 are viewed in this figure. This cup provides a cavity whereby a threaded nut may rest in order to secure the dome handle to the stem of the valve.

FIG. 3b is a view of the under side of dome handle 5. In this view, several reinforcing ridges 19 are shown extending away from stem insertion cavity 20. Once again, finger grips 18 are revealed.

FIG. 3c is a sectional view of dome handle 5 shown in FIG. 3. In this view, stem insertion cavity 20 is more clearly illustrated. This cavity is of compatible size and shape to permit the stem of the stem of valve 3 to rest securely within slipping. Round hole 22 is of sufficient diameter to permit the threaded portion of this same stem to pass through and extend into the area of cup 21. Again, the finger grips are illustrated. Weathering guard recess 23 is shown also. This recess that extends around the full interior perimeter of the dome will permit the dome handle to set snugly over the shroud 1 when the globe valve is in the closed position. Further explanation of the use of this recess follows.

FIG. 4 is sectional view of the top position of the pedestal hydrant. In this view, dome handle 5 is shown fully positioned onto the stem of globe valve 3. The stem fits into stem insertion cavity 20 with the threads passing through round hole 22, and into stem securing nut cup 21. Stem securing nut 16 that is a locking type threaded nut is then turned or threaded onto the stem, thus securing the dome handle onto the valve stem. The use of wave washer 65 provides added compression distance for the stem to seat within the valve opposed by the compression of weathering-guard gasket 30 within dome handle 5 seated against stainless steel shroud 1.

This figure further illustrates how weathering-guard recess 23 fits around the shroud. The addition of weathering-guard gasket 30 assures a positive watertight seal when the valve is in the closed position, thus preventing rainwater from entering the interior cavity of the shroud.

MIP x Hose adapter, ("Male iron pipe"), 29 is inserted into the outlet of valve 3. Gasket 58 is placed around the outlet side of adapter 29 prior to its insertion through a hole in shroud 1. Once inserted through the hole, hose fitting vacuum breaker 4 is affixed to adapter 29. This is accomplished by the threading of this vacuum breaker onto the male threads of the adapter. Having gasket 58 positioned on the inside of the shroud ensures a watertight seal at this penetration. Threaded nipple 6 is illustrated in the inserted position at the inlet to valve 3.

FIG. 5 details the components of under-deck flange 9. Threaded hex nuts 12 are positioned around the exterior perimeter of this flange. These nuts are welded into place directly over round hole 26 as shown in FIG. 5*a*. Bend lines 24 are at each side of this flange. Welded seam points 25 are at each corner of the bent portion of this flange.

Under-deck cylinder 10 is attached to flange 9 with tack-weld seam 28. This cylinder is round in design and of sufficient size to permit the fully assembled flange 9 to fit around the shroud of the pedestal hydrant. Threaded hex nuts 12 are positioned and then welded along the lower section of this cylinder.

FIG. 5*a* illustrates the shape of under-deck flange 9 prior to forming and welding. Cylinder hole 27 appears in the center of the flange. Round holes 26 appear along each side. Bend points 24 are indicated at each side. The under-deck cylinder is positioned around this cylinder hole and then tack-welded in several spots to secure it to the flange.

FIG. 5*b* illustrates how a round piece of sheet metal is roller in order to form the cylinder 10. Weld seam point 25 is at the point of connection of the two ends of the cylinder. Round holes 26 appear at the bottom of the cylinder. The threaded hex nuts mentioned above are welded to cylinder 10 directly over these holes.

FIG. 5*c* illustrates how before mentioned threaded hex nuts 12 in FIG. 5 are welded to under-deck flange 9 directly over round holes 26.

FIG. 6 illustrates the assembly of the pedestal hydrant shroud with the fully assembled under-deck flange 9. Under-deck cylinder 10 slips over shroud 1 from the bottom. The cylinder 10 has hex-head screws inserted for later fastening into the threaded hex nuts located at the bottom of the cylinder. Wing nut set screws 13 are inserted from the inner side of the under-deck flange into threaded hex nuts 12 that were welded along the outer surface of the flange.

Threaded nipple 6 and threaded tee 7 are illustrated so as to demonstrate that these components will, while in place, pass through the cylinder to be later connected to a water source once installation of the pedestal hydrant is complete. Also disclosed in the figure is snap-in cover 17. This plastic cover is snapped into place by applying hand pressure and conceals stem securing nut 16 which rests with stem securing nut cup 21.

FIG. 7 illustrates a complete assembled and installed pedestal hydrant. In this view, the hydrant is positioned atop roof insulation 38. Stainless steel base 2 rests firmly on this insulation material. Roofing material 37 is applied to the adjoining surface thus making a watertight joint between the base and the roof surface. The method of applying this roofing material is any of several commonly known conventional methods.

Once the pedestal hydrant shroud is in position, under-deck flange 9 is slipped up and then around the bottom of the hydrant shroud from below the roof surface. The flanges 9 is fitted securely against roof decking 39. A steel angle framing 40, which is of conventional and common design, has been added at the roof deck. The flange is fitted securely under this framing and secured in place by tightening wing nut set screws against this framing.

Once the flange is secured, hex-head screws 11 are tightened against shroud 1. In this manner, the pedestal hydrant is positively attached to the roofing structure, thus preventing unexpected disruption of the hydrant.

Once the pedestal hydrant is firmly in place, water supply connection is made at threaded tee 7. Pipe fitting adapter 34 is inserted into the open threads at the inlet of the tee. Water supply piping 35 is then extended from a water source to the hydrant. Drain piping 36 is attached to tee 7 at its outlet branch. Adapter 34 and pipe elbow fitting 33 are used to illustrate common methods of making this connection. It is common in the piping trade to furnish a supply valve to turn OFF such appliances as the pedestal hydrant. Such methods are considered appropriate in the supply piping of the invented pedestal hydrant. The use of the threaded tee is intended for dual purposes. First, if a galvanized threaded nipple is used for nipple 6, then industry practice often requires a fitting to provide separation from dissimilar metals. A brass fitting is utilized for threaded tee 7 to comply with this standard. Secondly, though insulation is installed around the valve and piping assembly of the pedestal hydrant, it may be from time to time advantageous to drain the piping in order to prevent potential freeze damage to the components. As illustrated in FIG. 7, threaded tee 7 enables the connection of draining piping for such purpose.

FIG. 8*a* illustrates a variation in assembly of the supply piping to threaded tee 7 whereby drain piping is omitted and pipe fitting plug 41 is inserted into the branch outlet of the tee.

FIG. 8*b* shows the construction of stirrup 14. Stirrup braces 32 that are made of rounded steel rod are affixed to stirrup collar 31. The collar is a round cylinder tube of sufficient diameter to permit threaded nipple 6 to smoothly but not loosely pass through its center. Taped holes 43 are positioned along the lower portion of the collar. Socket set screws are inserted into each taped hole 43.

FIG. 8*c* illustrates how stirrup 14 is secured to threaded nipple 6. This stirrup, during assembly of the pedestal shroud, is welded to the bottom of the shroud at termination points of each of the stirrup braces 32. Socket set screws 15 are tightened against threaded nipple 6, thus securing the nipple and attached valve assembly in place.

Description and Operation of Alternative Embodiments

FIGS. 9 thru 9*d* are drawings of components of an alternated style of a conventional valve assemble that would be utilized in the assembly of the Pedestal Hydrant in such cases where cold weather conditions dictated that added precautions should be emphasized. Brief explanation of this common style of valve assembly is made in order to illustrate to the reader how this style of valves is incorporated into the design of the Pedestal Hydrant. A common term for this style is "freeze-proof". FIG. 9 is a drawing of piston cylinder 44, O-ring 46 and retaining washer 47. Also illustrated is a sectional view of the cylinder 44 disclosing interior piston threads 45. A round shaft illustrated along the side surface of this cylinder.

FIG. 9*a* discloses valve stem 48. The stem has normal coarse threads at its top. These threads will accept the stem securing nut during assembly of the hydrant. Two insert grooves 51 are positioned along the linear surface of this round valve stem. Threads typical to valve stems appear at the bottom of this stem. During assembly of the hydrant, O-ring 46 and retaining washer 47 will be inserted into these grooves.

FIG. 9*b* is a side and sectional view of valve body 50. Drain port 53 appears at one side of this round in shape valve body. Valve seat 54 is located at the inner base of this body. The sectional view discloses standard female pipe threads within the body and directly below the valve seat. FIG. 9*c* represents three views of retaining bushing 49. The top illustration shows the side of the bushing and discloses a hexagon shaped upper portion that is used to secure the busing by using a standard wrench. Standard threads appear along the bottom of the bushing. The middle illustration is the top view of this bushing. The top has a relatively flat surface. The remaining illustration is a bottom view. The reader can see that the base of the bushing is round. A round hole passes through the axis of the bushing from top to bottom. This hole is without threads or other obstructions and is of sufficient size to permit a snug fit when the valve stem 48 is inserted from the bottom with O-ring 46 in place in the top insert groove 51.

FIG. 9*d* is again of valve body 50. The top view is at the left, and the bottom view is at the right. Valve seat 54 appears in the top view in the center of the body. Also visible are retaining flanges 52. Their purpose is explained in further figures. The bottom view represents that the bottom of this valve body is rounded.

Moving to FIGS. 10 and 10*a*, it will be explained to the reader how this common valve assemble functions in the assembled Pedestal Hydrant. Beginning in FIG. 10, it is seen that valve stem 48 has been inserted from the bottom into retaining bushing 49. Retaining washer 47 has been slipped onto the stem. This washer will prevent the stem from being extracted from the top of the assembled valve. The threaded lower portion of the stem is inserted into piston cylinder 44. Through the round shaft in the cylinder, the engagement of the male stem threads onto the cylinder female threads is visible. According to this embodiment, these threads are reverse threads and are of matching style and size. A conventional threaded rod coupling 57 is threaded onto the lower outer threads that appear at the base of the cylinder. Valve guide rod 56, having conventional threads at either end, is attached to rod coupling 57.

Now by viewing FIG. 10*a*, the view of the lower portion of the valve assemble is shown. In this sectional view, valve plunger 55 is attached to valve guide rod 56. The figure illustrates the assembled valve in the closed position.

FIG. 10*b* discloses the Pedestal Hydrant fully assembled. A brief description of the operation and function of this described conventional style of "freeze-proof" valve follows:

As shown in FIG. 10*b*, nipple 6, has a larger diameter than that used in the preferred embodiment of the invention, and also spans the distance between the valve body 50 and threaded tee 59. The valve stem assembly comprising of valve stem 48 and retaining bushing 49; as well as piston cylinder 44, O-ring 46, retaining washer 47, rod coupling 57, valve guide rod 56, and valve plunger 55, as shown in FIG. 10, is inserted into the threaded tee from the and extends through nipple 6 to the valve body at the base. The bushing is tightened securely into place in the end outlet of the threaded tee.

When operating the Pedestal Hydrant, the user would turn dome handle 5 counter-clockwise to open the valve and permit the flow of water. Because of the reverse threads on both the valve stem and valve cylinder, the shaft and thereby valve plunger are drawn upwards permitting water to enter the chamber that is created within the threaded nipple and between the valve body and upper tee with bushing. The round shaft in the valve cylinder enables water to easily flow out the side outlet of the threaded tee.

A threaded bushing 60 is inserted into this outlet to throttle down the flow. The same assembly as shown in FIG. 4 is utilized to provide hose threads at the exterior of shroud 1. Hose fitting vacuum breaker 4 appears on the outer surface while MIP x hose adapter 29 and gasket 58 remains concealed within the interior. In this FIG. 10*b*, stem securing nut 16 is shown above dome handle 5.

Once the user closes the valve by turning the handle clock-wise, the valve stem assemble with plunger are driven down against the valve stem, thus ceasing the flow of water. Drain port 53 which was obstructed during the open state of the valve now becomes unobstructed, thus permitting the draining of all water that remains after the valve has been closed. The before mentioned retaining flanges 52 hold the valve plunger away from the sides of the interior of the valve body thus permitting water to pass along its sides.

The only significant difference between this "freeze-proof" valve assembly and any of many typical styles of a conventional "freeze-proof" valve assemble is in the use of a threaded tee to comprise the upper portion of the completely assembled valve. In this alternate embodiment of the Pedestal hydrant, because the valve assembly appears within a confined enclosure or shroud, it becomes necessary to extend the outlet side of the valve to beyond the surface of the shroud. Typical "freeze proof" valves would be fitted with a hose fitting body rather than a threaded tee.

FIG. 11 details another use for the Pedestal Hydrant. In this figure, all components are as indicated in the embodiment shown in FIG. 6. This embodiment is used when placing the hydrant in either landscape or other traffic areas. In this use, the portion of the hydrant that would typically appear below the roofline will be positioned below the ground surface. The reader will observe that the under-deck flange has been omitted and under-deck cylinder 10 has been modified. Steel anchoring bars 62, four-(4) total are securely welded in place at each side of the cylinder. As illustrated, the Pedestal Hydrant has been placed within a concrete walkway 64 that has steel reinforcing bar. Then, prior to backfill of the dirt material, Anchoring concrete 63 also having steel reinforcing bars 61 is poured into place at the ends of each steel anchoring bar.

Water supply piping 35 is connected below ground to the inlet of threaded tee 7. Drain piping 36 may be either extended to a more remote location or omitted in its entirety. The technique to secure threaded nipple 6 to the hydrant is also utilized in this embodiment. Socket wing nuts 15 are tightened at stirrup 14 against the threaded nipple.

CONCLUSIONS, RAMIFICATIONS, AND SCOPE OF THE INVENTION

Thus the reader will see that the invented pedestal hydrant provides a practical method to deliver water efficiently for the described intended purpose by the activation of the hydrant assembly while providing for a securely affixed, weather resistive housing.

Although the description contains many specifications, these should not be construed as limiting the scope of the invention but as merely providing illustrations of the presently preferred embodiment of the invention. The many uses of the invention should not be limited by the example of use here in described. Thus the scope of the invention should be determined by the appended claims and their legal equivalents, rather than by the example given.

I claim:

1. A weather protected fluid delivery assembly comprising:
   a base member for lying along a surface, said base member defining an aperture;
   an elongated protective shroud extending through said aperture of said base member and having a top portion and a bottom portion, said shroud including an outlet aperture in said top portion;
   a fluid valving assembly for receiving a fluid from a supply source, said fluid valving assembly located within said elongated protective shroud and comprising:
      a pipe fitting having a first port for receiving said fluid and a second port for deliverying said fluid,
      an outlet fluid member connected to said second port of said pipe fitting and extending through said outlet aperture in said top portion of said protective shroud,
      a valve control stem extending above said top portion of said protective shroud, and
      a pipe nipple connected to said first port of said pipe fitting and extending to said bottom portion of said protective shroud;
   a valve coupled to said valve control stem for controlling the flow of said fluid; and
   a handle member covering the end of said top portion of said protective shroud to protect said fluid valving assembly from inclimate weather.

2. The fluid delivery assembly of claim 1 whereby said valve for controlling said fluid is a conventional fluid valve assembly and is positioned in said pipe fitting.

3. The fluid delivery of claim 1 whereby said protective shroud comprises:
   a section of stainless steel tubing having said top portion positioned above said base member and the remainder below,
   said base member comprising a sheet of stainless metal whereby said metal is affixed to said shroud to form a flat surfaced flashing member, and
   whereby said shroud with said flashing permits the assembly to be secured to the roof of a building in a weather tight manner.

4. The fluid delivery assembly of claim 1 further comprising a freeze resistant member.

5. The fluid delivery assembly of claim 4 whereby said freeze resistant member is pre-formed pipe insulation.

6. The fluid delivery assembly of claim 1 wherein said handle member is a freely turning dome handle comprising:
   a cast metal reinforced dome having a smooth, rounded upper surface, defining a cavity.

7. The fluid delivery assembly of claim 1, wherein said outlet fluid member further comprises a vacuum breaker.

8. The fluid delivery assembly of claim 1 further comprising a support affixing member, said support affixing member comprising a cylinder and anchoring rods attached to said cylinder, and wherein said cylinder is affixed to a lower portion of said shroud with said attaching hardware, and said anchoring rods positioned about the outer surface of said cylinder for securing, said rods to a building structure.

9. The fluid delivery assembly of claim 1, wherein said valve for controlling the flow of fluid is below said bottom end of said protective shroud, and said valve control stem extends through said pipe nipple to said valve.

10. The fluid delivery assembly of claim 9, wherein said valve for controlling further comprises a drain port.

\* \* \* \* \*